G. W. SCHERMERHORN.
Paint-Brush Handle.
No. 168,187.                  Patented Sept. 28, 1875.
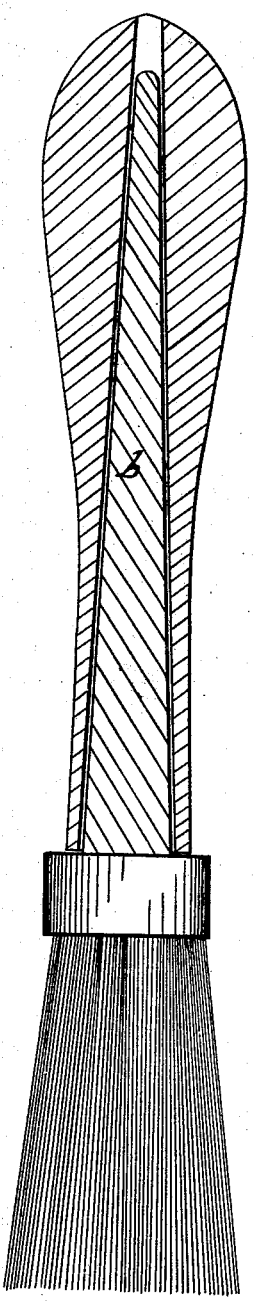

UNITED STATES PATENT OFFICE.

GEORGE W. SCHERMERHORN, OF EAST LIVINGSTON, MAINE.

IMPROVEMENT IN PAINT-BRUSH HANDLES.

Specification forming part of Letters Patent No. 168,187, dated September 28, 1875; application filed August 6, 1875.

*To all whom it may concern:*

Be it known that I, GEORGE W. SCHERMERHORN, of East Livingston, in the county of York and State of Maine, have invented certain new and useful Improvements in Paint-Brush Handles; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The drawing shows a side view, in part section, of my invention.

The object of my invention is to produce such an improvement upon the handles of ordinary paint-brushes as will make them more convenient and easier to hold in use.

My improvement is to be combined with the ordinary tapering handle of a paint-brush.

It is well known that these handles are now made of tapering form from the butt of the bristles and the ferrule up to the top end of said handle. The necessity of so making them is occasioned by the fact that in the manufacture of the brush the handle is driven up through the bristles and through the ferrule in order that the enlarged lower end of the handle may properly expand the bristles and so create the pressure necessary to bind and hold them within the ferrule. The handle tapering toward the hand, however, renders the brush inconvenient to hold. The handles of most other tools are made larger at the end toward the user, and this is the form most suitable to the hand.

In order to accomplish the same convenience and form of handle in a paint-brush, and at the same time to preserve the tapering form for the purposes before described, I apply the supplemental handle *a*. This is perforated to receive the tapering stock or handle *b*, and slips over *b* with sufficient tightness to adhere thereto.

The supplemental handle may be provided with a screw-thread to match with another on the tapering stock or handle.

A set-screw, bolt, or any convenient method of fastening may be applied, if desired.

The tapering stock or handle *b* need not extend the whole length of the supplemental handle *a*.

The convenience of this arrangement is apparent, as it affords a handle fitted to the hand, and one which can be used upon a number of brushes.

The supplemental handle is herein specified as being larger at the end toward the hand; but it is evident that it may be made of uniform size or of any form to obviate the inconvenience of the ordinary handle.

This improvement permits of the tapering handle being made shorter than ordinary, if desired, and also permits of its being fitted into the ferrule only of the supplemental handle *a*, the wood part of said handle remaining solid.

What I claim as my invention, and desire to secure by Letters Patent, is—

In combination with an ordinary paint-brush having the tapering stock or handle *b*, the perforated removable handle *a*, applied as and for the purposes set forth.

In testimony that I claim the foregoing as my own I affix my signature in presence of two witnesses.

GEO. W. SCHERMERHORN.

Witnesses:
 WM. HENRY CLIFFORD,
 FRANK H. JORDAN.